United States Patent
Sargent

(10) Patent No.: US 6,301,978 B1
(45) Date of Patent: Oct. 16, 2001

(54) DEVICE FOR TESTING A VEHICLE ENGINE PULLEY

(76) Inventor: Scott F. Sargent, 168 W. Collins St., Mobile, AL (US) 36606

( * ) Notice: Subject to any disclaimer, the term of this patent is extended or adjusted under 35 U.S.C. 154(b) by 0 days.

(21) Appl. No.: 09/449,079

(22) Filed: Nov. 24, 1999

(51) Int. Cl.$^7$ ........................................... G01L 5/12
(52) U.S. Cl. .................... 73/862.49; 73/862.45; 73/862.47; 73/862.48
(58) Field of Search ............. 474/8, 135; 56/12.7; 73/118.1, 144, 7, 862.45, 862.49, 862.48, 862.47

(56) References Cited

U.S. PATENT DOCUMENTS

| | | |
|---|---|---|
| 486,598 | 11/1892 | Okamuro . |
| 2,795,135 | 6/1957 | Kremser . |
| 3,839,908 | 10/1974 | Casper . |
| 4,235,091 * | 11/1980 | Takano et al. ................ 73/7 |
| 4,237,719 * | 12/1980 | Takano ........................... 73/7 |
| 4,362,062 | 12/1982 | Peterson . |
| 4,444,065 | 4/1984 | Okamuro . |
| 4,731,044 * | 3/1988 | Mott ............................ 474/8 |
| 4,860,597 * | 8/1989 | Fenech ..................... 73/862.45 |
| 5,354,242 * | 10/1994 | St. John ..................... 474/135 |
| 5,780,731 * | 6/1998 | Matsui et al. ............... 73/118.1 |

* cited by examiner

*Primary Examiner*—Benjamin R. Fuller
*Assistant Examiner*—Lilybett Martir
(74) *Attorney, Agent, or Firm*—Kenneth L Tolar

(57) ABSTRACT

A device for testing an engine pulley includes an elongated tubular shaft formed of two telescoping sections that are spring biased in a retracted position. A handle is disposed at a first end of the shaft and a motor driven pulley is rotatably mounted to the opposing end. When the shaft is extended against the bias of the spring, electrical contact between an external power source and the motor is established. A belt is placed about the motor driven pulley and the engine pulley to rotate the select engine pulley independently of the remaining engine pulleys allowing a user to audibly and visually determine if the pulley is malfunctioning.

6 Claims, 1 Drawing Sheet

DEVICE FOR TESTING A VEHICLE ENGINE PULLEY

BACKGROUND OF THE INVENTION

The present invention relates to a device that allows a user to isolate and test an engine pulley in order to determine if the pulley needs repairing or replacing.

DESCRIPTION OF THE PRIOR ART

Various engine parts include one or more pulleys all of which are encompassed and driven by a single serpentine belt. Often, the pulleys begin rattling or squeaking which is not only annoying but can indicate that the pulley is loosening or deteriorating. However, because all of the pulleys are simultaneously operated by a single belt, it is difficult, if not impossible, to determine which pulley is malfunctioning when the engine is running. The present invention relates to a uniquely configured device for isolating and individually rotating a select pulley allowing a mechanic to systematically determine which vehicle pulley is malfunctioning.

Although a plurality of belt tensioning gauges exist, no devices have been heretofore designed for testing individual engine pulleys. Various engine testers exist in the prior art. For example, U.S. Pat. No. 4,860,597 issued to Fenech relates to a belt tension tester including an enclosure with a movable load cell therein. The load cell is connected at one end to a belt contacting member and at the other end to a manually activated handle.

U.S. Pat. No. 4,444,065 issued to Okamuro relates to a belt tension gauge for accurately and visually indicating the tension on a fan belt including a spring loaded activating member movable on a frame. The frame also includes an indicator for displaying the belt tension.

Various other belt tension gauges also exist such as those disclosed in U.S. Pat. No. 4,362,062 issued to Peterson, U.S. Pat. No. 4,186,598 issued to Okamuro, U.S. Pat. No. 3,839,908 issued to Casper and U.S. Pat. No. 2,795,135 issued to Kremser.

Although a myriad of belt tension gauges exist, there are no devices specifically designed to individually test engine pulleys. The present invention provides a compact hand held device having a motorized pulley attached thereto that, in combination with a belt, drives a select engine pulley to assist a user in determining if the engine pulley is defective, worn or otherwise malfunctioning.

SUMMARY OF THE INVENTION

The present invention relates to a device for isolating and testing an individual engine pulley. The device comprises an elongated hollow tubular shaft formed of a pair of telescoping sections whereby the shaft may be extended and retracted. The two telescoping shaft sections are spring biased in a retracted position. The shaft includes a handle at a first end and a motor driven pulley at an opposing end. A belt is placed about the pulley as well as a select engine pulley. When the shaft is extended, an activation means starts the motor to synchronously rotate the pulley, belt and designated engine pulley. It is therefore an object of the present invention to provide a device which allows a user to individually test a select engine pulley.

It is another object of the present invention to provide a device for testing a select engine pulley that is easy to use and inexpensive to manufacture.

It is yet another object of the present invention to provide a device for testing a select engine pulley that is powered with a vehicle engine. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
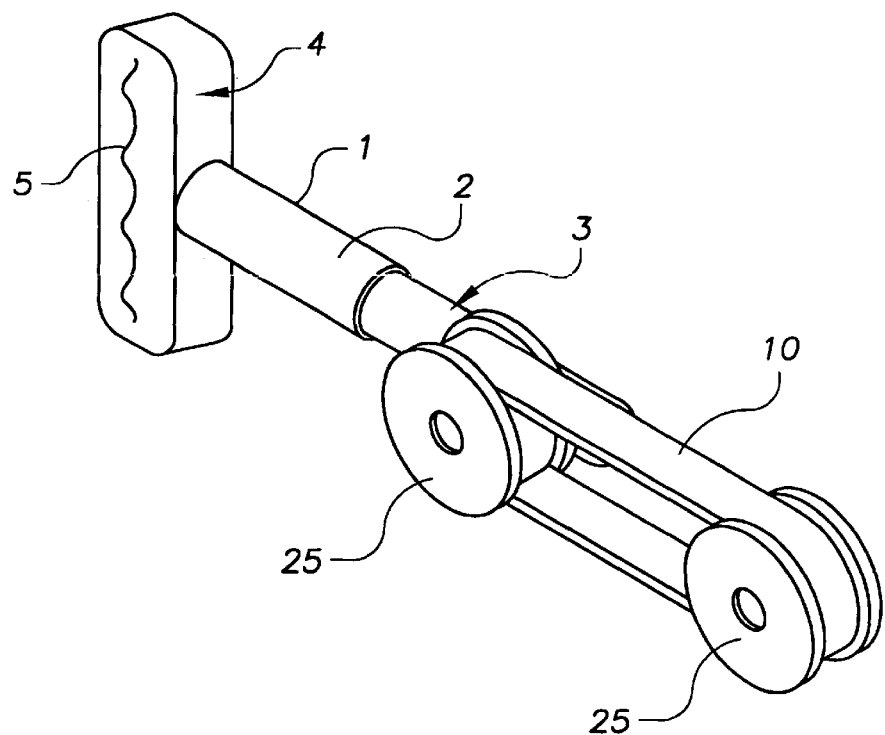
FIG. 1 is a perspective view of the device secured to an engine pulley.
Figure 2:
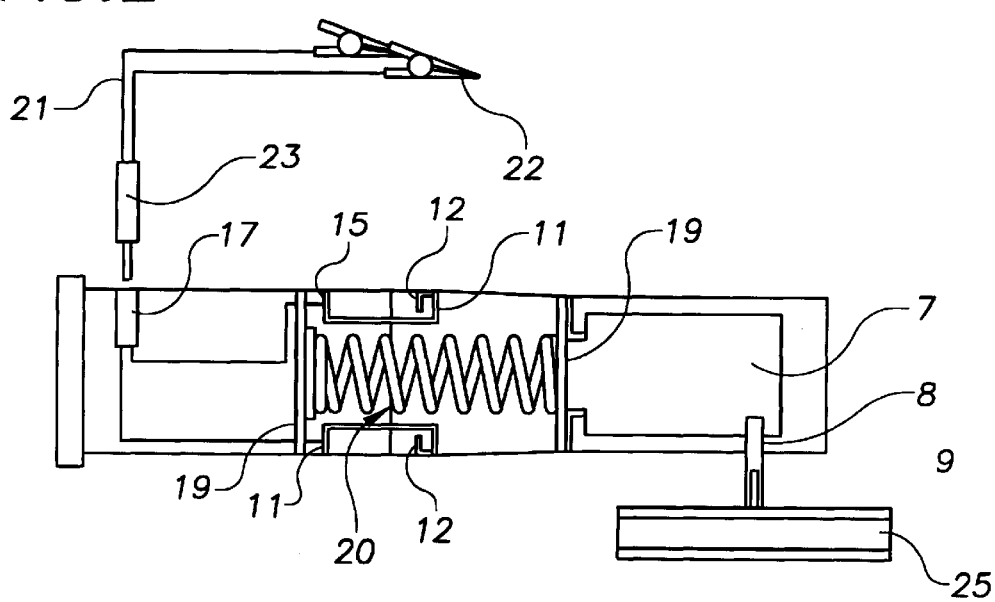
FIG. 2 is a cross-sectional view of the device.

Referring now to FIGS. 1 and 2, the present invention relates to a device for testing an individual engine pulley. The device comprises an elongated hollow tubular shaft 1 having first and second ends. The shaft is formed of a pair of telescoping sections 2, 3 whereby the length of the shaft can be extended and retracted. Attached to a first end of the shaft is a handle 4 which is grasped by a user when operating the device. The handle is preferably covered with foam or rubber and includes finger indentions 5 thereon for enhanced comfort.

Rotatably mounted on the opposing end is an axle 8 having a pulley 25 attached thereto. Received within one of the telescoping sections is an electric motor 7 for operably driving the axle and pulley. The axle includes a keyway 9 for receiving a key within a central bore on the pulley. Accordingly, any one of a plurality of varying size pulleys may be interchangeably attached to the axle depending upon the size of the pulley being tested. A plurality of belts 10 each having a desired length are also provided for encompassing the drive pulley as well as the engine pulley.

An activation means is also provided for selectively operating the motor. The activation means includes a pair of diametrically opposed, fixed electrical contacts 12 disposed within one of the sections. The fixed contacts are electrically connected to the motor. A pair of substantially U-shaped contacts 11 extend from the interior of one section to the interior of the other. Each U-shaped contact includes a pair of spaced terminals 15 having one of the fixed contacts 12 therebetween. The U-shaped contacts are electrically connected to an external receptacle 17 on one of the shaft sections.

Also received within the shaft are a pair of transverse spaced partitions 19 having a spring 20 disposed therebetween. Each end of the spring is attached to a partition so that the spring biases the shaft in a retracted position to prevent engagement of the fixed contact with either terminal. When the shaft is extended a predetermined distance, the terminals engage the fixed contacts thereby establishing communication between the receptacle and motor. The above described activation means not only activates the motor but also allows a user to apply tension to the belt.

The device also includes a power cord 21 having alligator clamps 22 at one end for coupling with the vehicle battery and a plug 23 at the other end configured to engage the receptacle. Alternatively, the shaft can include a rechargeable battery in communication with the U-shaped contacts for powering the motor.

To use the above described device, the serpentine belt is removed. The desired pulley is attached to the shaft and a belt is placed about the shaft pulley and a select engine pulley. The electrical cord is plugged into the receptacle and the alligator clamps are properly secured to the vehicle battery terminals. A user grasps and pulls the handle until the shaft is sufficiently extended to establish communication between the vehicle battery and motor. The drive pulley will then operably rotate the engine pulley allowing the user to determine if the engine pulley is malfunctioning.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A device for testing an engine pulley comprising:

a power source a shaft having a drive pulley rotatably mounted thereon, said shaft including a pair of telescoping sections, said sections biased in a retracted position wherein a length of said shaft is selectively extendable;

a motor received within said shaft and connected to said drive pulley for automatically rotating said drive pulley;

a belt encompassing said drive pulley and said engine pulley so that said motor will simultaneously rotate said drive pulley and said engine pulley;

an activation means for selectively activating said motor, said activation means including a first fixed electrical contact within said shaft and electrically connected to said motor, a second electrical contact received within said shaft and in communication with said power source, said first contact and second contact being separated when said shaft sections are in said retracted position and said first contact engaging said second contact electrically connecting said power source to said motor; when said shaft sections are in an extended position.

2. The device for testing an engine pulley according to claim 1 further comprising a handle on an end of said shaft which is grasped by a user to operate said device and to extend said shaft.

3. The device for testing an engine pulley according to claim 2 wherein said drive pulley is removable.

4. The device for testing an engine pulley according to claim 3 whereon one of said shaft sections includes a receptacle electrically connected to said second electrical contact.

5. The device for testing an engine pulley according to claim 4 further comprising a battery source, a cord having a plug at a first end adapted to be coupled with said receptacle and a pair of clamps at an opposing end which are secured to said battery source.

6. The device for testing an engine pulley according to claim 3 wherein said drive pulley includes an axle attached to said shaft, said axle including a keyway that removably receives a key on said drive pulley, allowing said pulley to be removed and replaced with a differing size drive pulley.

* * * * *